(12) United States Patent
Nunez et al.

(10) Patent No.: US 8,967,799 B2
(45) Date of Patent: Mar. 3, 2015

(54) METHOD OF PREPARING WATER EXTRACTABLE SILICON-CONTAINING BIOMEDICAL DEVICES

(71) Applicant: Bausch & Lomb Incorporated, Rochester, NY (US)

(72) Inventors: Ivan M. Nunez, Penfield, NY (US); Joseph A. McGee, Canandaigua, NY (US); Jay Friedrich Kunzler, Canandaigua, NY (US); Michele Alton, Rochester, NY (US); Analuz Changano, Spencerport, NY (US); Jennifer Hunt, Batavia, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 89 days.

(21) Appl. No.: 13/722,073

(22) Filed: Dec. 20, 2012

(65) Prior Publication Data
US 2014/0179824 A1   Jun. 26, 2014

(51) Int. Cl.
*G02C 7/04* (2006.01)
*B29D 1/00* (2006.01)
*G02B 1/04* (2006.01)

(52) U.S. Cl.
CPC . *G02C 7/04* (2013.01); *G02B 1/043* (2013.01)
USPC .............. 351/159.8; 351/159.02; 351/159.33; 523/107

(58) Field of Classification Search
USPC ............. 359/159.8, 159.02, 159.33; 523/107; 351/159.8, 159.02, 159.33
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,113,224 A | 9/1978 | Clark et al. | |
| 4,136,250 A | 1/1979 | Mueller et al. | |
| 4,153,641 A | 5/1979 | Deichert et al. | |
| 4,197,266 A | 4/1980 | Clark et al. | |
| 4,495,313 A | 1/1985 | Larsen | |
| 4,640,489 A * | 2/1987 | Larsen | 249/122 |
| 4,680,336 A | 7/1987 | Larsen et al. | |
| 4,740,533 A | 4/1988 | Su et al. | |
| 4,889,664 A | 12/1989 | Kindt-Larsen et al. | |
| 4,910,277 A | 3/1990 | Bambury et al. | |
| 4,954,587 A | 9/1990 | Mueller | |
| 5,010,141 A | 4/1991 | Mueller | |
| 5,034,461 A | 7/1991 | Lai et al. | |
| 5,039,459 A | 8/1991 | Kindt-Larsen et al. | |
| 5,070,215 A | 12/1991 | Bambury et al. | |
| 5,079,319 A | 1/1992 | Mueller | |
| 5,260,000 A | 11/1993 | Nandu et al. | |
| 5,271,875 A | 12/1993 | Appleton et al. | |
| 5,310,779 A | 5/1994 | Lai | |
| 5,321,108 A | 6/1994 | Kunzler et al. | |
| 5,358,995 A | 10/1994 | Lai et al. | |
| 5,387,662 A | 2/1995 | Kunzler et al. | |
| 5,449,729 A | 9/1995 | Lai | |
| 5,512,205 A | 4/1996 | Lai | |
| 6,071,439 A | 6/2000 | Bawa et al. | |
| 6,440,366 B1 | 8/2002 | Salpekar et al. | |
| 6,998,465 B2 | 2/2006 | Yokoyama et al. | |
| 2008/0128930 A1 | 6/2008 | Lai et al. | |
| 2012/0115980 A1 | 5/2012 | Vanderlaan et al. | |

FOREIGN PATENT DOCUMENTS

WO    96/31792    10/1996

OTHER PUBLICATIONS

"The Oxygen Permeability of Reference Materials," Optom Vis Sci 7 (12s): 95 (1997).
PCT International Search Report and Written Opinion of the International Searching Authority in corresponding International Application No. PCT/US2013/076114, dated Feb. 12, 2014 (6 pages).
Written Opinion of the International Searching Authority in corresponding International Application No. PCT/US2013/076114, mailed Nov. 26, 2014 (5 pages).

\* cited by examiner

*Primary Examiner* — Tae H Yoon
(74) *Attorney, Agent, or Firm* — Toan P. Vo

(57) ABSTRACT

A method of preparing a water extractable silicon-containing biomedical device is disclosed. The method involves curing a monomer mixture comprising one or more silicon-containing biomedical device-forming monomers in the presence of a diluent to produce a silicon-containing biomedical device; wherein the diluent comprises a boric acid ester of a $C_1$ to $C_8$ monohydric alcohol.

26 Claims, No Drawings

METHOD OF PREPARING WATER EXTRACTABLE SILICON-CONTAINING BIOMEDICAL DEVICES

BACKGROUND OF THE INVENTION

1. Technical Field

The present invention generally relates to a method of preparing water extractable silicon-containing biomedical devices such as silicon hydrogels, e.g., contact lenses, intraocular lenses, and other ophthalmic devices.

2. Description of the Related Art

Hydrogels represent a desirable class of materials for the manufacture of various biomedical devices, including contact lenses. A hydrogel is a hydrated cross-linked polymeric system that contains water in an equilibrium state. Hydrogel lenses offer desirable biocompatibility and comfort. A silicon hydrogel is a hydrogel material including a silicon-containing monomer, the silicon containing monomer imparting higher oxygen permeability to the resultant hydrogel copolymer.

In general, a hydrogel polymeric ophthalmic device can be obtained by direct molding of a polymerizable monomer mixture wherein the mixture is dissolved in a non-aqueous, displaceable diluent. In this method the polymerizable mixture is placed in a mold having the precise shape of the final desired hydrogel (i.e., water-swollen) lens and the monomer/diluent mixture is then subjected to conditions whereby the monomer(s) polymerize to produce a polymer/diluent mixture in the shape of the final desired hydrogel lens. The polymerization is generally carried out in a non-aqueous medium because water can interfere with the polymerization reaction and adversely affect the properties of the resulting polymer. At some point, after the polymerization is complete, the diluent is displaced with water to produce a hydrated lens whose final size and shape approximates the size and shape of the original molded polymer/solvent article. Such direct molding of hydrogel contact lenses is disclosed in, for example, U.S. Pat. Nos. 4,495,313, 4,680,336, 4,889,664 and 5,039,459.

In U.S. Pat. Nos. 4,495,313, 4,889,664 and 5,039,459, the displaceable diluents disclosed are water-displaceable boric acid esters of polyhydric alcohols. In U.S. Pat. No. 4,680,336, the displaceable diluents disclosed are water-displaceable organic compounds selected on the basis of their viscosity and their Hansen cohesion parameters relative to the cohesion parameters of the polymeric component of the hydrogel to be prepared. Examples of diluents disclosed in the '336 patent include the ester reaction product of a di- or tricarboxylic acid or anhydride with a $C_3$ to $C_4$ alkane diol or triol, a polyol selected from the group consisting of hexane-1,2,6 triol and diglycerol, and a mixture of glycerol with a polyhydroxyl compound having at least two hydroxyl groups and a Hansen cohesion parameter $\delta_h$ of less than 25.

However, at least dihydric alcohol boric acid esters are not effective at solubilizing silicon-containing monomers in a silicon hydrogel monomer mix. This lack of solubilizing ability (as displaceable diluents in a silicon-containing monomer mix) may result in a hazy or opaque lens. It is known that monohydric alcohols of indeterminate molecular weight can be used to adjust the viscosity of at least dihydric alcohol boric acid esters. Heretofore, there has been no recognition or appreciation that low molecular weight monohydric alcohol boric acid esters can be used as a water-displaceable diluent/solubilizer/solvent/viscosity modifier in a silicon-containing biomedical device forming monomer mix which is capable of forming a water extractable silicon-containing biomedical device after polymerization.

Accordingly, it would be desirable to provide an improved method for making water extractable silicon-containing biomedical devices such as silicon hydrogel contact lenses that is simple and cost effective.

SUMMARY OF THE INVENTION

In accordance with one embodiment of the present invention, there is provided a method of preparing a water extractable silicon-containing biomedical device comprising the step of curing a monomer mixture comprising one or more silicon-containing biomedical device-forming monomers in the presence of a diluent under conditions sufficient to polymerize the monomer mixture to produce a water extractable silicon-containing biomedical device; wherein the diluent comprises a boric acid ester of a $C_1$ to $C_8$ monohydric alcohol.

In accordance with a second embodiment of the present invention, there is provided a method of preparing a water extractable silicon-containing biomedical device comprising the step of:

(a) curing a monomer mixture comprising one or more silicon-containing biomedical device-forming monomers in the presence of a diluent under conditions sufficient to polymerize the monomer mixture to produce a water extractable silicon-containing biomedical device; wherein the diluent comprises a boric acid ester of a $C_1$ to $C_8$ monohydric alcohol; and (b) thereafter replacing the diluent with water.

In accordance with a third embodiment of the present invention, there is provided a method of preparing a water extractable silicon hydrogel comprising the steps of:

(a) casting a monomer mixture comprising one or more silicon-containing hydrogel-forming monomers in the presence of a diluent under conditions sufficient to polymerize the monomer mixture to produce a water extractable silicon hydrogel; wherein the diluent comprises a boric acid ester of a $C_1$ to $C_8$ monohydric alcohol; and (b) thereafter replacing the diluent with water.

In accordance with a fourth embodiment of the present invention, there is provided a method for dry releasing a silicon-containing biomedical device from a mold, the method comprising the steps of:

(a) curing a monomer mixture in a mold under conditions sufficient to polymerize the monomer mixture to produce a water extractable silicon-containing biomedical device, wherein the monomer mixture comprises one or more silicon-containing biomedical device-forming monomers and a diluent; wherein the diluent comprises a boric acid ester of a $C_1$ to $C_8$ monohydric alcohol; and (b) dry releasing the silicon-containing biomedical device from the mold.

The present invention is based on the surprising discovery that boric acid esters of a $C_1$ to $C_8$ monohydric alcohol can be used as water-displaceable diluent/solubilizer/solvent/viscosity modifier in a method for making shaped water extractable silicon-containing biomedical devices, e.g., soft contact lenses such as silicon hydrogels, from monomer mixtures containing one or more silicon-containing biomedical device-forming monomers. For purposes of this application, the terms "water-displaceable diluent/solubilizer/solvent/viscosity modifier" are potential alternative uses of the same material in a monomer mixture. The $C_1$ to $C_8$ monohydric alcohol boric acid esters are water soluble, such that the cured silicon-containing biomedical device can be easily dry released and then extracted with water or an aqueous solvent thus making them water extractable silicon-containing biomedical devices. In addition, the $C_1$ to $C_8$ monohydric alcohol boric acid esters allow the one or more silicon-containing biomedical device-forming monomers and a hydrophilic monomer to be miscible with one another for curing so there is no phase-separation or a cloudy lens. Thus, a significant advantage that is imparted by the use of water-displaceable $C_1$ to $C_8$ monohydric alcohol boric acid esters in the method of the present invention is an enhanced ability to employ silicon-containing biomedical device-forming monomers in the polymerization mixture. This is in contrast to monomer mixtures containing silicon-containing biomedical device-foci ling monomers and a boric acid ester of a polyhydric alcohol as a water-displaceable diluent/solubilizer/solvent/viscosity modifier, where it has been found that the silicon-containing biomedical device-forming monomers are not soluble in the mixture resulting in phase separation and therefore a cloudy or opaque lens.

Further, after curing and prior to water extraction, the polymerization product such as a button possesses a suitable hardness (and modulus) which allows for lathing of the button to provide a lens. By possessing a suitable hardness (and modulus), the polymerization product can be readily dry released from its mold prior to the extraction step (a harder lens is easier to dry release and handle than a softer lens). Thus the polymerization product can be dry released and then extracted. This is also in contrast to the use of a monohydric alcohol as compared to its corresponding boric acid ester, or the use of a polyhydric alcohol as a diluent in a silicon hydrogel forming monomer mix which does not result in unextracted lenses that possess a suitable hardness for subsequent machining steps such as lathing. In other words, a lens buttons produced from a polyhydric alcohol boric acid ester containing monomer mixture can be neither dry released nor shaped by lathing.

In order to facilitate dry release of the lens, the method of the present invention can involve a "decapping" step, i.e., separating one mold section from the second mold section with the lens being retained in the second mold section. The lens is then removed (i.e., dry released) from the second mold section, for example, by mechanically removing the lens from the second mold section without the use of an aqueous solution.

By being able to dry release the polymerization product from the method of the present invention, Applicants can avoid the following problems: (1) excessive force being required for removing the lens from the mold which could lead to tearing of the lens thereby rendering it inoperable; or (2) additional processing steps such as using a diluent to wet release the lens from the mold and then removing the diluent with a vacuum and optionally heat (in the case where the diluent is a high boiling solvent) which may degrade the lens.

The present invention therefore provides processing advantages in producing shaped silicon-containing biomedical devices, including enhanced decapping (i.e., the ability to open the mold after polymerization with less force), which results in economic advantages such as a saving of labor costs, and a significant increase in yield because of a reduced proportion of surface defects in the molded articles that would cause rejection.

Finally, the method of the present invention may be carried out without the need for a solvent extraction step. e.g., an isopropanol, ethanol, methanol or an ethyl acetate extraction step, thereby resulting in a simple, safe and cost effective method.

DETAILED DESCRIPTION OF THE PREFERRED EMBODIMENTS

The present invention is directed to a method of making water extractable silicon-containing biomedical devices. In general, the method involves at least the step of curing a monomer mixture comprising one or more silicon-containing biomedical device-forming monomers in the presence of a diluent under conditions sufficient to polymerize the monomer mixture to produce a water extractable silicon-containing biomedical device; wherein the diluent comprises a boric acid ester of a $C_1$ to $C_8$ monohydric alcohol. In another embodiment, the method further involves the step of thereafter replacing the diluent with water.

Unless clearly stated otherwise or as understood by common custom and usage all numerical values contained herein represent percent by weight. Also, the term "about" as used with numerical values herein is to be understood to represent the standard deviation of the mean as is typically encountered in the production of the biomedical device according to the invention herein.

As used herein, a "biomedical device" is any article that is designed to be used while either in or on mammalian tissues or fluid, and preferably in or on human tissue or fluids. Representative examples of biomedical devices include, but are not limited to, artificial ureters, diaphragms, intrauterine devices, heart valves, catheters, denture liners, prosthetic devices, ophthalmic lens applications, where the lens is intended for direct placement in or on the eye, such as, for example, intraocular devices and contact lenses.

In one preferred embodiment, the biomedical device is an ophthalmic device, particularly contact lenses, most particularly contact lenses made from silicon hydrogels. As used herein, the term "ophthalmic device" and "lens" refer to devices that reside in or on the eye. These devices can provide optical correction, wound care, drug delivery, diagnostic functionality or cosmetic enhancement or effect or a combination of these properties. Useful ophthalmic devices include, but are not limited to, ophthalmic lenses such as soft contact lenses, e.g., a soft, hydrogel lens; soft, non-hydrogel lens and the like, hard contact lenses, e.g., a hard, gas permeable lens material and the like, intraocular lenses, overlay lenses, ocular inserts, optical inserts and the like. As is understood by one skilled in the art, a lens is considered to be "soft" if it can be folded back upon itself without breaking. The ophthalmic devices such as contact lenses of the present invention can be spherical, toric, bifocal, may contain cosmetic tints, opaque cosmetic patterns, combinations thereof and the like.

The method of the present invention preferably forms a soft contact lens such as those commonly referred to as silicon hydrogel lenses, prepared from at least one silicon-containing biomedical device-forming monomers as discussed hereinbelow. Accordingly, the present invention is applicable to a wide variety of materials, and silicon hydrogel materials are particularly preferred. Silicon hydrogels in general are a well-known class of materials that comprise hydrated, cross-linked polymeric systems containing water in an equilibrium state. Silicon hydrogels generally have water content greater than about 5 weight percent and more commonly between about 10 to about 80 weight percent. Such materials are usually prepared by polymerizing a mixture containing one or more silicon-containing biomedical device-forming monomers and at least one hydrophilic monomer. Typically, either the silicon-containing biomedical device-forming monomer or the hydrophilic monomer functions as a crosslinking agent (a crosslinker being defined as a monomer having multiple polymerizable functionalities) or a separate crosslinker may be employed.

In general, silicon-containing biomedical device-forming monomers for use in the formation of silicon-containing biomedical devices such as hydrogels include silicon monomers containing one or more Si—O units as well as silicon monomers containing one or more silicon atoms with one or more Si—O units. In one preferred embodiment, a silicon monomer contains more than one Si—O unit to provide a lens having a desired oxygen permeability. Silicon-containing monomers are well known in the art and numerous examples are provided in U.S. Pat. Nos. 4,136,250; 4,153,641; 4,740,533; 5,034,461; 5,070,215; 5,260,000; 5,310,779; and 5,358,995. Representative examples of applicable silicon-containing monomeric units include bulky polysiloxanylalkyl (meth) acrylic monomers represented by the structure of Formula I:

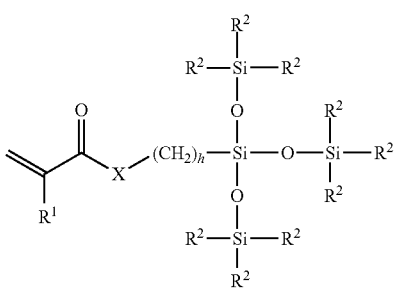
(I)

wherein X denotes —O— or —NR—; each $R^1$ independently denotes hydrogen or methyl; each $R^2$ independently denotes a lower alkyl radical, phenyl radical or a group represented by

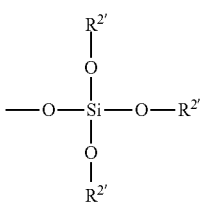

wherein each $R^{2'}$ independently denotes a lower alkyl or phenyl radical; and h is 1 to 10.

Examples of bulky monomers are 3-methacryloyloxypropyltris(trimethyl-siloxy)silane or tris(trimethylsiloxy)silylpropyl methacrylate, sometimes referred to as TRIS and tris (trimethylsiloxy)silylpropyl vinyl carbamate, sometimes referred to as TRIS-VC, (3-methacryloxy-2-hydroxy propoxy) propyl bis (trimethyl siloxy) methyl silane, sometimes referred to as Sigma and the like.

Such bulky monomers may be copolymerized with a silicon macromonomer, such as a poly(organosiloxane) capped with an unsaturated group at two or more ends of the molecule. U.S. Pat. No. 4,153,641 discloses, for example, various unsaturated groups such as acryloyloxy or methacryloyloxy groups.

Another class of representative silicon-containing monomers includes, but is not limited to, silicon-containing vinyl carbonate or vinyl carbamate monomers such as, for example, 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris (trimethylsiloxy)silyl]propyl vinyl carbamate; 3-[tris (trimethylsiloxy)silyl]propyl allyl carbamate; 3-[tris (trimethylsiloxy)silyl]propyl vinyl carbonate; t-butyldimethylsiloxyethyl vinyl carbonate; trimethylsilylethyl vinyl carbonate; trimethylsilyl ethyl vinyl carbonate and the like and mixtures thereof.

Another class of silicon-containing monomers includes polyurethane-polysiloxane macromonomers (also sometimes referred to as prepolymers), which may have hard-soft-hard blocks like traditional urethane elastomers. They may be end-capped with a hydrophilic monomer such as 2-hydroxyethyl methacrylate (HEMA). Examples of such silicon-containing urethanes are disclosed in a variety or publications, including PCT Published Application No. WO 96/31792 discloses examples of such monomers, which disclosure is hereby incorporated by reference in its entirety. Representative examples of silicon-containing urethanes are represented by Formulae II and III:

E(*D*A*D*G)$_a$*D*A*D*E'; or  (II)

E(*D*G*D*A)$_a$*D*A*D*E'; or  (III)

wherein:

D independently denotes an alkyl diradical, an alkyl cycloalkyl diradical, a cycloalkyl diradical, an aryl diradical or an alkylaryl diradical having 6 to about 30 carbon atoms;

G independently denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;

* denotes a urethane or ureido linkage;

a is at least 1;

A independently denotes a divalent polymeric radical of Formula IV:

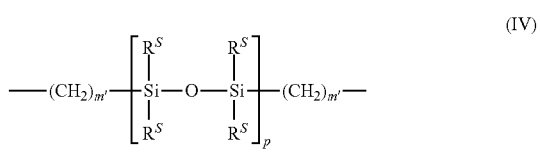
(IV)

wherein each $R^s$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;

each of E and E' independently denotes a polymerizable unsaturated organic radical represented by Formula V:

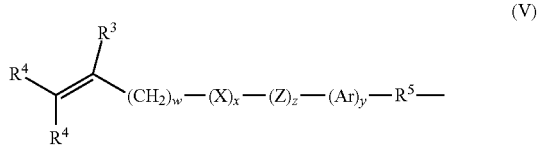
(V)

wherein: $R^3$ is hydrogen or methyl;

$R^4$ is hydrogen, an alkyl radical having 1 to 6 carbon atoms, or a —CO—Y—$R^6$ radical wherein Y is —O—, —S— or —NH—;

$R^5$ is a divalent alkylene radical having 1 to about 10 carbon atoms;

$R^6$ is a alkyl radical having 1 to about 12 carbon atoms;

X denotes —CO— or —OCO—;

Z denotes —O— or —NH—;

Ar denotes an aromatic radical having about 6 to about 30 carbon atoms;

w is 0 to 6; x is 0 or 1; y is 0 or 1; and z is 0 or 1.

One preferred silicon-containing urethane is represented by Formula VI:

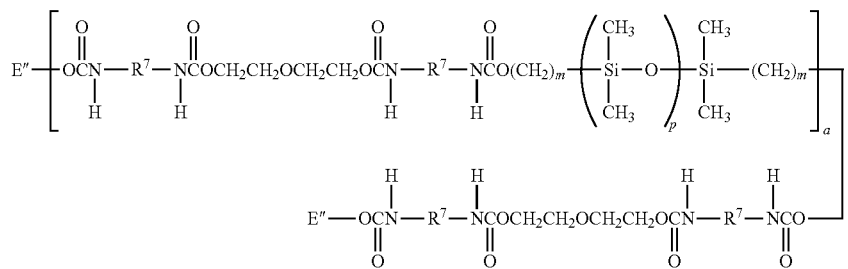

wherein m is at least 1 and is preferably 3 or 4, a is at least 1 and preferably is 1, p is a number which provides a moiety weight of about 400 to about 10,000 and is preferably at least about 30, $R^7$ is a diradical of a diisocyanate after removal of the isocyanate group, such as the diradical of isophorone diisocyanate, and each E″ is a group represented by:

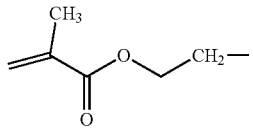

In another embodiment of the present invention, a silicon hydrogel material comprises (in bulk, that is, in the monomer mixture that is copolymerized) about 5 to about 70 percent, or from about 10 to about 60 percent, by weight of one or more silicon macromonomers, about 5 to about 60 percent, or from about 10 to about 60 percent, by weight of one or more polysiloxanylalkyl (meth)acrylic monomers, and about 20 to about 60 percent, or from about 10 to about 50 percent, by weight of a hydrophilic monomer. In general, the silicon macromonomer is a poly(organosiloxane) capped with an unsaturated group at one or more ends of the molecule. In addition to the end groups in the above structural formulas, U.S. Pat. No. 4,153,641 discloses additional unsaturated groups, including acryloyloxy or methacryloyloxy groups. Fumarate-containing materials such as those disclosed in U.S. Pat. Nos. 5,310,779; 5,449,729 and 5,512,205 are also useful substrates in accordance with the invention. Preferably, the silicon-containing monomer is a silicon-containing vinyl carbonate or vinyl carbamate or a polyurethane-polysiloxane having one or more hard-soft-hard blocks and end-capped with a hydrophilic monomer. The silicon-containing monomers can be present in the mixtures in an amount ranging from 10 to about 75 weight percent, based on the total weight of the monomer mixture.

The above materials are merely exemplary silicon-containing monomers and have been disclosed in various publications and are being continuously developed for use in forming silicon-containing biomedical devices such as contact lenses. For example, a silicon-containing biomedical device for use herein can be formed from at least a cationic silicon-containing biomedical device-forming monomer. In another embodiment, a silicon-containing biomedical device for use herein can be formed from at least a fluorinated silicon-containing biomedical device-forming monomer. Such material have been used in the formation of fluorosilicon hydrogels to reduce the accumulation of deposits on contact lenses made therefrom, as disclosed in, for example, U.S. Pat. Nos. 4,954,587; 5,010,141 and 5,079,319. The use of silicon-containing biomedical device-forming monomers having certain fluorinated side groups, i.e., —($CF_2$)—H, can also be used herein, such as those disclosed in, e.g., U.S. Pat. Nos. 5,321,108 and 5,387,662.

The monomer mixture employed in the method of the present invention to obtain the silicon-containing biomedical devices can contain one or more comonomers in addition to the one or more silicon-containing biomedical device-forming monomers. Examples of suitable comonomers include hydrophilic comonomers, non-silicon-containing hydrophobic monomers and mixtures thereto. Useful hydrophilic monomers include one or more unsaturated carboxylic acids, vinyl lactams, amides, polymerizable amines, vinyl carbonates, vinyl carbamates, oxazolone monomers, and the like and mixtures thereof. Representative examples of useful amides include acrylamides such as N,N-dimethylacrylamide and N,N-dimethylmethacrylamide. Representative examples of useful vinyl lactams include cyclic lactams such as N-vinyl-2-pyrrolidone. Examples of other hydrophilic monomers include poly(alkene glycols) functionalized with polymerizable groups. Examples of useful functionalized poly(alkene glycols) include poly(diethylene glycols) of varying chain length containing monomethacrylate or dimethacrylate end caps. In one preferred embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. The hydrophilic monomers can be present in the monomer mixtures in an amount ranging from 10 to about 75 weight percent, based on the total weight of the monomer mixture.

Suitable non-silicon-containing hydrophobic monomers include ethylenically unsaturated hydrophobic monomers such as, for example, (meth)acrylates-containing hydrophobic monomers, N-alkyl (meth)acrylamides-containing hydrophobic monomers, alkyl vinylcarbonates-containing hydrophobic monomers, alkyl vinylcarbamates-containing hydrophobic monomers, fluoroalkyl (meth)acrylates-containing hydrophobic monomers, N-fluoroalkyl (meth)acrylamides-containing hydrophobic monomers, N-fluoroalkyl vinylcarbonates-containing hydrophobic monomers, N-fluoroalkyl vinylcarbamates-containing hydrophobic monomers, (meth)acrylamides-containing hydrophobic monomers, vinyl carbonates-containing hydrophobic monomers, vinyl carbamates-containing hydrophobic monomers, styrenic-containing hydrophobic monomers, polyoxypropylene (meth)acrylate-containing hydrophobic monomers and the like and mixtures thereof. Non-silicon containing bulky hydrophobic monomers may also be present. For example, t-butyl(meth)acrylate, isobornyl(meth)acrylate adamentyl (meth)acrylate and the like and mixtures thereof. As used herein, the term "(meth)" denotes an optional methyl substituent. Thus, terms such as "(meth)acrylate" denotes either methacrylate or acrylate, and "(meth)acrylamide" denotes either methacrylamide or acrylamide. The non-silicon-containing hydrophobic monomers can be present in the mixtures in an amount ranging from 0 to about 20 weight percent, based on the total weight of the monomer mixture.

The monomer mixture can also include a crosslinking monomer (a crosslinking monomer or crosslinker being defined as a monomer having multiple polymerizable functionalities). In the case where the silicon-containing biomedical device-forming monomer is a prepolymer endcapped at both ends with a polymerizable radical, these prepolymers will function as a crosslinker. Optionally, a supplemental crosslinking monomer may be added to the initial monomeric mixture. Representative crosslinking monomers include: divinylbenzene, allyl methacrylate, ethyleneglycol dimethacrylate, tetraethyleneglycol dimethacrylate, polyethyleneglycol dimethacrylate, vinyl carbonate derivatives of the glycol dimethacrylates, and methacryloxyethyl vinylcarbonate. When a supplemental crosslinking agent is employed, this monomeric material may be included in the monomer mixture at 0.1 to 20 weight percent, more preferably at 0.2 to 10 weight percent.

The boric acid ester present in the monomer mixture is a boric acid ester of a $C_1$ to $C_8$ monohydric alcohol and is used in the method of the present invention as a water-displaceable diluent/solubilizer/solvent/viscosity modifier. The boric acid esters are prepared by procedures analogous to those that are known in the art, such as the monohydric alcohol boric acid esters prepared in U.S. Pat. No. 6,998,465, the contents of which are incorporated by reference herein. For example, the boric acid esters of a $C_1$ to $C_8$ monohydric alcohol used in the method of the present invention can be obtained by reacting boric acid or anhydrous boric acid with a $C_1$ to $C_8$ monohydric alcohol and removing the water formed by the reaction by normal procedures such as by vacuum distillation. The boric acid compound and monohydric alcohol are mixed together in an amount ranging from about 1 mole equivalent of boric acid and from about 3.0 to about 6.0 mole equivalents of monohydric alcohol. The reaction of boric acid with the monohydric alcohol is carried out at a temperature and for a period of time sufficient to form the ester. Typical reaction temperatures are usually found within the range of from about 15° C. to about 100° C. At these temperatures, reaction times will ordinarily range from about 1 to about 24 hours. In general, the reaction is continued until the water content of the ester is less than about 2%, by weight.

In one embodiment. examples of suitable monohydric alcohols would include a $C_1$ to $C_8$ straight or branched chain monohydric alcohols, $C_5$ to $C_8$ cycloalkyl monohydric alcohols, $C_5$ to $C_8$ aromatic monohydric alcohols and mixtures of any of the above. Useful monohydric alcohols would include, but not be limited to, methanol, ethanol, propanol, n-propanol, iso-propanol, n-butanol, t-butanol, isobutanol, 2-ethylhexanol, 2-methylcyclohexanol, 2-methyl-1-propanol, n-pentanol, 2-pentanol, 3-pentanol, 2-methyl-1-butanol, 3-methyl-1-butanol, 2-methyl-2-butanol, 3-methyl-2-butanol, 3,7-dimethyl-3-octanol, 2,2-dimethyl-1-propanol, 1-hexanol, 1-octanol, 2-octanol, cyclohexanol, cyclopentanol, benzyl alcohol, and the like and mixtures thereof.

Representative examples of suitable boric acid ester for use herein would therefore include, but not be limited to, trimethyl borate, triethyl borate, tri-n-propyl borate, triisopropyl borate, tri-n-butyl borate, tri-tert-butyl borate and the like and mixtures thereof.

In general, the boric acid ester of a $C_1$ to $C_8$ monohydric alcohol is present in the monomer mixture in an amount of about 5 to about 50 percent by weight, based on the total weight of the monomer mixture. In one embodiment, the boric acid ester of a $C_1$ to $C_8$ monohydric alcohol is present in the monomer mixture in an amount of about 15 to about 30 percent by weight, based on the total weight of the monomer mixture.

If desired, the monomer mix can also contain the corresponding monohydric alcohol used to form the boric acid ester as an additional diluent in the monomer mix. Examples of such monohydric alcohols include those discussed above.

The monomeric mixture may further contain, as necessary and within limits not to impair the purpose and effect of the present invention, various additives such as an antioxidant, coloring agent, ultraviolet absorber, lubricant internal wetting agents, toughening agents and the like and other constituents as is well known in the art.

Generally, contact lenses can be obtained by curing the monomer mixture under conditions sufficient to polymerize the monomer mixture to produce a water extractable silicon-containing biomedical device. Various processes are known for curing a monomeric mixture in the production of contact lenses including, by way of example, spincasting and static casting. For example, spincasting methods involve charging the monomer mixture in an open faced mold having a concave bottom surface, i.e., a one-piece mold, and spinning the mold in a controlled manner while exposing the monomer mixture to light, such as UV light. Static casting methods involve charging the monomer mixture between two mold sections, one mold section shaped to form the anterior lens surface and the other mold section shaped to form the posterior lens surface, and curing the monomer mixture while retained in the mold assembly to form a lens, for example, by free radical polymerization of the mixture. Spincasting methods are disclosed in U.S. Pat. Nos. 3,408,429 and 3,660,545, and static casting methods are disclosed in U.S. Pat. Nos. 4,113,224, 4,197,266, and 5,271,875. Additionally, the monomer mixtures may be cast in the shape of rods or buttons, which are then lathe cut into a desired lens shape.

Polymerization may be facilitated by exposing the mixture to heat and/or radiation, such as ultraviolet light, visible light, or high energy radiation. A polymerization initiator may be included in the mixture to facilitate the polymerization step. Representative examples of free radical thermal polymerization initiators include organic peroxides such as acetyl peroxide, lauroyl peroxide, decanoyl peroxide, stearoyl peroxide, benzoyl peroxide, tertiarylbutyl peroxypivalate, peroxydicarbonate, and the like and azo compounds such as 2,2'-azobisisobutyronitrile (AIBN), 1,1'-azobis(cyclohexanecarbonitrile), 4,4'-azobis(4-cyanovaleric acid), and the like. Representative UV initiators are those known in the art and include benzoin methyl ether, benzoin ethyl ether, Darocure 1173, 1164, 2273, 1116, 2959, 3331 (EM Industries) and Irgacure 651 and 184 (BASF), and the like. Representative examples of visible light initiators include phosphine oxides such as Irgacure 819, Darocure TPO (BASF), Lucirin TPO, Lucirin TPO-L (BASF), etc. Generally, the initiator will be employed in the mixture at a concentration of about 0.01 to about 5 percent by weight of the total monomer mixture.

Generally, polymerization under ultra-violet (UV) or Visible light ('blue light') curing polymerization conditions can be carried out for about 15 minutes to about 60 minutes and under an inert atmosphere of, for example, nitrogen or argon. Polymerization under thermal curing conditions generally requires higher temperatures, e.g., about 40 to about 120° C.) for a time period of about 10 to about 72 hours.

Following casting, the polymerization product, which generally undergoes subsequent processes to provide a silicon-containing biomedical device, is dry released from the mold. In the case where the mold is a two-part mold assembly, including a posterior mold half and an anterior mold half, dry release is carried out when one of the mold halves is removed, i.e., de-capped, with the cast polymerization product remaining adhered to the other mold half. In many processes, it is desired that the polymerization product remains with the anterior mold half. In general, a dry release process involves releasing the polymerization product from the mold half in a dry state and without adding aqueous media. While not wishing to be bound by theory, it is believed that the boric acid ester of a $C_1$ to $C_8$ monohydric alcohol cross-links with the polymerization product during curing such that the polymerization product possesses a sufficient hardness to allow it to be dry released from the mold. One skilled in the art would readily appreciate that the term "sufficient hardness" means that the resulting polymerization product is not so soft that it tears during the dry release process (e.g., when being removed from mold with mechanical grippers) or is too brittle such that it shatters or breaks upon being subjected to the mechanical forces encountered during the dry release process.

In one embodiment, the polymerization product can be dry released by simply removing the polymerization product from the mold in a dry state. In another embodiment, dry release is accomplished by way of mechanical actions in which the polymerization product is removed mechanically from the molds using mechanical grippers such as tweezers, taking a precaution of not to tear the polymerization product. In the event that mechanical removal cannot be carried out, the mold half containing the polymerization product is mechanically deformed to forcibly dry release it.

Once the polymerization products which are subsequently modified to yield silicon-containing biomedical devices such as contact lenses are dry released, they can then be subjected to optional machining operations. For example, the machining operation could include one of the following three lathing (machining) operations of the lenses:

1. A monomer mix is cast and cured in a long cylindrical mold, the resulting rod (hard plastic at this point) is removed from the mold, cut into smaller discs and subsequently lathed on both sides to form a lens. The resulting lens is then extracted and hydrated.

2. A monomer mix is cast into a short cylindrical mold to form a hard plastic button (disc-like) which is removed from the mold and lathed on both sides to form a lens. The resulting lens is then extracted and hydrated. This process avoids the cutting step.

3. A monomer mix is cast into a single part, half mold, i.e., a one piece mold (with curvature on one side only). The mold may or may not have a lid to cover the flat side. The monomer mix is then cured and the dome-shaped hard part is removed from the mold and machined. Lathing is confined to one side only to generate the concave half of the lens. The lens is then extracted and hydrated.

Other optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

If desired, once the polymerization product is dry released and optionally lathed, it can be extracted with a suitable solvent in which the crosslinks of the boric acid ester of a $C_1$ to $C_8$ monohydric alcohol are broken and the boric acid ester is displaced from the polymerization product to provide a water extractable silicon-containing biomedical device. A suitable solvent includes a polar solvent. Useful polar solvents include water, alcohols, esters, hydroxy and glycol esters, polyols and ketones, and mixtures thereof.

Suitable alcohols for extraction include, but are not limited to, straight or branched chain $C_1$ to $C_5$ alcohols, such as methanol, ethanol, n-propanol, iso-propanol, mixtures of propanol isomers, n-butanol, sec-butanol, tert-butanol, iso-butanol, mixtures of butanol isomers 2-methyl-1-butanol, n-pentanol, mixtures of pentanol isomers and amyl alcohol (mixture of isomers), and mixtures thereof.

Suitable esters for extraction include, but are not limited to, methyl acetate, ethyl acetate, n-propyl acetate, iso-propyl acetate, n-butyl acetate, iso-butyl acetate, sec-butyl acetate, amyl acetate (mixture of isomers), methylamyl acetate, 2-ethylhexyl acetate and iso-butyl isobutyrate, and mixtures thereof.

Suitable hydroxy and glycol esters for extraction include, but are not limited to, methyl glycol acetate, ethyl glycol acetate, butyl glycol acetate, ethyl diglycol acetate, butyl diglycol acetate, ethyl lactate, n-butyl lactate, 3-methoxy-n-butyl acetate, ethylene glycol diacetate, glycolic acid-n-butyl ester, 2-methylpropanoic acid-2,2,4-trimethyl-3-hydroxypentyl ester, methyl glycol, ethyl glycol, iso-propyl glycol, 3-methoxybutanol, butyl glycol, iso-butyl glycol, methyl diglycol, ethyl diglycol, butyl diglycol, iso-butyl diglycol, diethylene glycol, dipropylene glycol, ethylene glycol monohexyl ether and diethylene glycol monohexyl ether, and mixtures thereof.

Suitable polyols for extraction include, but are not limited to, ethylene glycol, propylene glycol, 1,3-butylene glycol, 1,4-butylene glycol, hexylene glycol, diethylene glycol, triethylene glycol and dipropylene glycol, and mixtures thereof.

Suitable ketones for extraction include, but are not limited to, iso-butyl heptyl ketone, cyclohexanone, methyl cyclohexanone, methyl iso-butenyl ketone, pent-oxone, acetyl acetone, diacetone alcohol, iso-phorone, methyl butyl ketone, ethyl propyl ketone, methyl iso-butyl ketone, methyl amyl ketone, methyl iso-amyl ketone, ethyl butyl ketone, ethyl amyl ketone, methyl hexyl ketone, diisopropyl ketone, diisobutyl ketone, acetone, methyl ethyl ketone, methyl propyl ketone and diethyl ketone, and mixtures thereof.

The extracted polymerization product is then hydrated with water or an aqueous solvent, e.g., 50% V/V isopropyl alcohol, or both in process steps to form a hydrogel as discussed above.

The lens may then be transferred to individual lens packages containing a buffered saline solution or other appropriate packaging solution such as that disclosed in U.S. Pat. No. 6,440,366 to Salpekar et al., the contents of which are incorporated by reference herein. The packaging solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative of the invention. The examples should not be read as limiting the scope of the invention as defined in the claims.

Analytical Measurements

1. Modulus (g/mm²) and elongation were measured per ASTM 1708a employing an Instron (Model 4502) instrument where the film sample was immersed in borate buffered saline; an appropriate size of the film sample was gauge length 22 mm and width 4.75 mm, where the sample further has ends forming a dogbone shape to accommodate gripping of the sample with clamps of the Instron instrument, and a thickness of 200±50 microns.

2. Tensile modulus (g/mm²) was measured at the initial linear portion of the stress/strain curve per ASTM test method D1708a.

3. Oxygen permeability (also referred to as Dk) was determined by the following procedure. Other methods and/or instruments may be used as long as the oxygen permeability values obtained therefrom are equivalent to the described method. The oxygen permeability of silicon hydrogels is measured by the polarographic method (ANSI Z80.20-1998) using an O2 Permeometer Model 201T instrument (Createch, Albany, Calif. USA) having a probe containing a central, circular gold cathode at its end and a silver anode insulated from the cathode. Measurements are taken only on pre-inspected pinhole-free, flat silicon hydrogel film samples of three different center thicknesses ranging from 150 to 600 microns. Center thickness measurements of the film samples may be measured using a Rehder ET-1 electronic thickness gauge. Generally, the film samples have the shape of a circular disk. Measurements are taken with the film sample and probe immersed in a bath containing circulating phosphate buffered saline (PBS) equilibrated at 35.degree. C.+/−0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample.

For silicon hydrogel films, it is frequently useful to employ a Teflon polymer membrane, e.g., having a circular disk shape, between the probe cathode and the film sample. In such cases, the Teflon membrane is first placed on the pre-moistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value. At least two Dk measurements per thickness, and meeting R2 value, are obtained. Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/−8.8% of the Repository values established by William J. Benjamin, et al., *The Oxygen Permeability of Reference Materials*, Optom Vis Sci 7 (12s): 95 (1997), the disclosure of which is incorporated herein in its entirety.

| MATERIAL NAME | Repository Values | Lower Limit | Upper Limit |
|---|---|---|---|
| Fluoroperm 30 | 26.2 | 24 | 29 |
| Menicon EX | 62.4 | 56 | 66 |
| Quantum II | 92.9 | 85 | 101 |

4. Water Content was measured by individually placing the lens on a piece of premoistened Whatman #1 filter paper. The surface moisture is removed by lightly smoothing a second piece of premoistened Whatman #1 filter paper over the lens. After checking the accuracy of the balance with two known weights, the lens is placed in a tared weigh boat. The wet weight is recorded to the nearest 0.1 mg and the lens transferred to the lens holder, concave side up (this allows the lens identity to be maintained to match wet and dry weights). After the lens holders are full, they are placed on a spindle with a plastic spacer between them and placed in a glass jar approximately ½ full of desiccant. The jar is capped and the lid tightened, then loosened slightly to prevent pressure buildup. The jar with lenses is placed in a 500-650 watt microwave oven along with a 400 ml beaker containing at least 200 ml of distilled water with boiling beads to keep the jar from becoming overheated. The jar is microwaved at 500-650 watts for 10 minutes; the start time and date are recorded on the paperwork. When the cycle finishes, the jar is removed from the microwave and allowed to cool on the bench for 30 minutes; time out and date are also recorded. When cool, the lenses are individually weighed and their dry weights recorded to the nearest 0.1 mg, matching the dry weights to the corresponding wet weight. The water content is expressed as % water according to the following formula:

$$\text{Water Content}(\%) = \frac{\text{Wet Weight} - \text{Dry Weight}}{\text{WetWeight}} \times 100$$

Shore D Hardness Measurements—Standard Test Method for Rubber Property—Durometer Hardness (ASTM Method # D2240-00). This test method permits hardness measurements based on either initial indentation or indentation after a specified period of time, or both. Indicators used to determine maximum hardness values of a material may yield lower hardness when the maximum indicator is used. Hardness measurements (and lathing rankings) are taken before the lens has been hydrated, whereas all other measurements herein are taken after the lens has been extracted and hydrated.

In the examples, the following abbreviations are used.
TRIS
Sigma
M1-EDS6
Ma2D37
Ma1D15
Irgacure 819
CIX-4
SA Monomer
NVP: N-vinyl-2-pyrrolidone
DMA: N,N-dimethyl acrylamide
HEMA: 2-hydroxyethyl methacrylate
Each of these abbreviations not defined above are defined as follows:

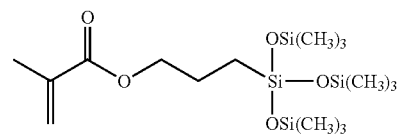

Methacryloxypropyltris(trimethylsiloxy)silane (TRIS)

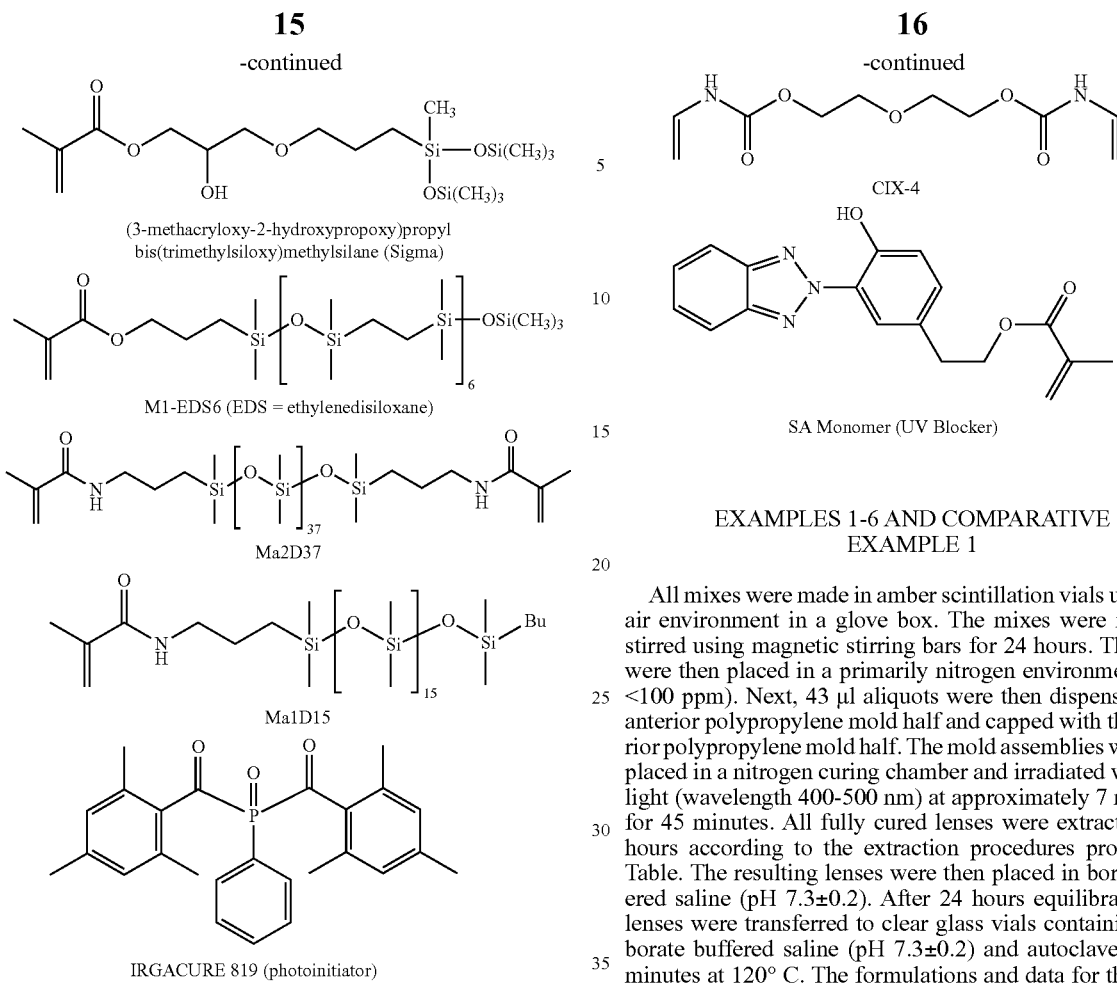

(3-methacryloxy-2-hydroxypropoxy)propyl bis(trimethylsiloxy)methylsilane (Sigma)

M1-EDS6 (EDS = ethylenedisiloxane)

Ma2D37

Ma1D15

IRGACURE 819 (photoinitiator)

CIX-4

SA Monomer (UV Blocker)

EXAMPLES 1-6 AND COMPARATIVE EXAMPLE 1

All mixes were made in amber scintillation vials under dry air environment in a glove box. The mixes were rolled or stirred using magnetic stirring bars for 24 hours. The mixes were then placed in a primarily nitrogen environment ($[O_2]$ <100 ppm). Next, 43 µl aliquots were then dispensed in an anterior polypropylene mold half and capped with the posterior polypropylene mold half. The mold assemblies were then placed in a nitrogen curing chamber and irradiated with blue light (wavelength 400-500 nm) at approximately 7 mW/cm$^2$ for 45 minutes. All fully cured lenses were extracted for 2 hours according to the extraction procedures provided in Table. The resulting lenses were then placed in borate buffered saline (pH 7.3±0.2). After 24 hours equilibration, the lenses were transferred to clear glass vials containing fresh borate buffered saline (pH 7.3±0.2) and autoclaved for 30 minutes at 120° C. The formulations and data for the lenses are set forth in Table 1.

TABLE 1

Formulation data and Properties

| Formulation | Composition (wt %) | | | | | | Comp. |
| | Ex. 1 | Ex. 2 | Ex. 3 | Ex. 4 | Ex. 5 | Ex. 6 | Ex. 1 |
|---|---|---|---|---|---|---|---|
| TRIS | 41 | 41 | 35.4 | — | 35.4 | — | 41 |
| Sigma | — | — | — | 35.4 | — | 35.4 | — |
| Ma2D37 | 9 | 9 | 8.2 | 8.2 | 8.2 | 8.2 | 9 |
| NVP | 43.7 | 43.7 | 32.5 | 32.5 | 32.5 | 32.5 | 43.7 |
| CIX-4 | 0.3 | 0.3 | — | — | — | — | 0.3 |
| HEMA | — | — | 5 | 5 | 5 | 5 | — |
| DMA | 6 | 6 | 5 | 5 | 5 | 5 | 6 |
| EDS6 | — | — | 13.2 | 13.2 | 13.2 | 13.2 | — |
| SA Monomer | — | — | 0.7 | 0.7 | 0.7 | 0.7 | — |
| Monomer Mix (total) | 100 | 100 | 100 | 100 | 100 | 100 | 100 |
| Irgacure 819 | 0.4 | 0.4 | 0.5 | 0.5 | 0.5 | 0.5 | 0.4 |
| Visibility Tint | 0.002 | 0.002 | 0.002 | 0.002 | 0.002 | 0.002 | 0.002 |
| Triisopropyl borate | 20 | — | — | — | — | — | — |
| Tri-n-butyl borate | — | — | — | — | 11.1 | 11.1 | — |
| Tri-tert-butyl borate | — | 20 | 11.1 | 11.1 | — | — | — |
| Hexanol | — | — | — | — | — | — | 20 |
| Properties | | | | | | | |
| Modulus (g/mm$^2$) | 93 (8) | 88 (6) | 101 (9) | 85 (8) | 92 (7) | 77 (7) | 104 (4) |
| Tensile Strength, (g/mm$^2$) | 79 (32) | 71 (31) | 100 (22) | 53 (26) | 89 (11) | 52 (31) | 102 (27) |
| Elongation (%) | 142 (56) | 130 (61) | 183 (38) | 96 (43) | 179 (19) | 102 (66) | 150 (39) |
| Tear Resistance | | | 6 (0.4) | 3 (0.3) | 6 (0.7) | 4 (1.0) | 6 (1) |
| % Water | 51.1 | 51.7 | 40.2 | 40.4 | 40.3 | 45.2 | 53.4 |

TABLE 1-continued

Formulation data and Properties

| Formulation | Composition (wt %) | | | | | | Comp. Ex. 1 |
|---|---|---|---|---|---|---|---|
| | Ex. 1 | Ex. 2 | Ex. 3 | Ex. 4 | Ex. 5 | Ex. 6 | |
| Captive Bubble CA | | | | | | | |
| Receding | 21 | 21 | 22 | 24 | 22 | 26 | — |
| Advancing | 32 | 39 | 53 | 79 | 70 | 87 | 33 |
| Hyst. | 11 | 18 | 31 | 56 | 48 | 61 | — |

The advantages of using triisopropyl borate instead of hexanol include (1) dry release capability even at higher concentrations of diluent, (2) the lens formed using triisopropyl borate as a diluents possessed suitable hardness (it became a plastic) instead of a flimsy easily breakable lens and (3) increased solubility of monomer mix.

Extractable Study

Extractable polymer content of the lenses of Examples 1 and 2 was determined by a gravimetric procedure using different extractants. The particular procedure of the gravimetric extractables determination is set forth as follows:

In a clean clear scintillation vial 3 dry lenses were weighed per vial totaling 3 vials. 3 mL of extractant were added to each vial and allowed to extract for 2 hrs at room temperature. The extractant was replaced with DI water. The lenses were then placed on a Teflon slab and dried under vacuum overnight. Each set of lenses was re-weighed. The extractables % was determined by the following equation and the results are set forth below in Table 2.

Extractables %=[(Dry weight before extraction−Dry weight after extraction)/Dry weight before extraction]*100

TABLE 2

Extractable Study

| Example. | Extractant | % Extractables |
|---|---|---|
| 1 | 100% IPA | 21.6 (1.9) |
| 1 | 50% IPA | 15.8 (0.6) |
| 1 | 100% DI H2O | 13.9 (1.5) |
| 2 | 100% IPA | 22.1 (2.5) |
| 2 | 50% IPA | 16.7 (1.7) |
| 2 | 100% DI H2O | 12.9 (1.5) |

EXAMPLES 7-9

Lenses were prepared in substantially the same manner as in Examples 1-6. The components and amounts used in preparing the lenses for each example are set forth in Table 3. As shown below, increasing the amount of the triisopropyl borate diluent did not compromise the dry release or material properties of the lenses.

TABLE 3

| | Example 7 | Example 8 | Example 9 |
|---|---|---|---|
| Formulation (wt %) | | | |
| Ma2D37 | 7.44 | 7.44 | 7.43 |
| TRIS | 36.70 | 36.70 | 36.70 |
| NVP | 32.49 | 32.50 | 32.50 |
| M1-EDS-6 | 13.36 | 13.36 | 13.36 |

TABLE 3-continued

| | Example 7 | Example 8 | Example 9 |
|---|---|---|---|
| DMA | 5.00 | 5.00 | 5.00 |
| HEMA | 5.00 | 5.00 | 5.00 |
| Monomer Mix Total | 100 | 100 | 100 |
| Irgacure 819 | 0.49 | 0.50 | 0.49 |
| Triisopropyl Borate | 10.00 | 15.00 | 20.00 |
| IMVT (tint) | 0.02 | 0.02 | 0.02 |
| Properties | | | |
| Modulus (g/mm$^2$) | 87 (4) | 68 (6) | 68 (4) |
| Tensile Strength (g/mm$^2$) | 104 (27) | 87 (11) | 71 (21) |
| % Elongation | 205 (32) | 215 (25) | 182 (53) |
| Water Content (%) | 46.2 (0.2) | 43.5 (0.5) | 46.3 (0.2) |
| Contact Angle (Adv.) | 32 (0) | 30 (0.4) | 32 (0.4) |
| | dry released | dry released | dry released |

EXAMPLES 10-29 AND COMPARATIVE EXAMPLE 2

The formulations of Examples 10-29 and Comparative Example 2 set forth below in Tables 4 and 5 were cast into lenses and buttons using the following procedures.

Lens Casting Procedure.

The following procedure illustrates a process for casting of a contact lens. Silicon hydrogel lenses made of the formulation of the examples in Tables 4 and 5 below were cast molded from polypropylene molds. Under an inert nitrogen atmosphere, 43 to 45 µl of the formulation was injected onto a clean polypropylene concave mold half and covered with the complementary polypropylene convex mold half. The mold halves were compressed using a top plate and then top plate was removed and the mixture was cured for about 27 minutes in the presence of visible light 0.588 mW/cm$^2$ as measured by an International Light Technologies Radiometer photometer model # ILT 1400-A. Cast molded lenses were cured by irradiating from the top.

The top mold half was removed and the lenses were dry released and extracted using four 1 hour changes of 1:1 isopropanol:DI water, then one 1 hour change of 100% DI water, followed by one 1 hour change of 100% Borate Buffered Solution (Examples 2, and 10-22). Alternative isocratic extractions with isopropanol:DI water were also used [60/40, 70/30 mixtures by volume] (Example 2). A gradient extraction ("stepped extraction") was also done using one 30 minute change of 1:1 isopropanol:DI water, three 15 minute changes of 100% isopropanol, one 30 minute change of 1:1 isopropanol:DI water, and two 30 minute changes of 100% DI water (Examples 23-29). The material properties and captive bubble contact angle data set forth in Tables 4 and 5 were measured on the cast molded lenses.

Button Casting Procedure.

The following procedure illustrates a process for casting of a button. Silicon hydrogel lenses made of the formulation of the examples in Tables 4 and 5 below were cast molded from polypropylene molds. Under an inert nitrogen atmosphere, 1.0 ml of the formulation was injected onto a clean polypropylene button mold and the mixture was cured for about 1 hour in the presence of visible light (~3.5 mW/cm2 as measured by an International Light Technologies Radiometer Photometer model # ILT 1400-A meter) irradiated from the top and bottom of the mold.

The buttons prepared with the borate diluents of this invention were dry released from the molds by applying a slight pressure to the underside of the mold causing the mold to flex and facilitate the release of the button from the mold. The buttons were then lathed as cast. The formulations prepared with hexanol as a diluent were released by placing the formulation in a vacuum oven at 80° C. with a nitrogen bleed for up to seven days, to reduce the concentration of diluent. The shore D hardness and lathing evaluations of the formulations in Tables 4 and 5 below were performed on molded buttons (i.e., prior to hydration).

TABLE 4

Diluent impact on dry lens Hardness

| Formulation | Comp. Ex. 2 | Ex. 10 | Ex. 11 | Ex. 12 | Ex. 13 |
|---|---|---|---|---|---|
| HEMA | 5.01 | 5.01 | 5.01 | 5.01 | 5.01 |
| DMA | 5.01 | 5.01 | 5.01 | 5.01 | 5.01 |
| NVP | 32.59 | 33.83 | 33.83 | 33.83 | 33.83 |
| M1-EDS6-TMS | 13.34 | 13.03 | 13.03 | 13.03 | 13.03 |
| TRIS | 36.81 | 35.09 | — | 35.09 | — |
| Ma2D37 | 7.23 | 8.02 | 8.02 | 8.02 | 8.02 |
| Sigma | — | — | 35.09 | — | 35.09 |
| CIX-4 | — | — | — | — | — |
| Monomer Mix (total) | 100 | 100 | 100 | 100 | 100 |
| Isopropyl borate | — | — | — | 10.03 | — |
| Tri-tert-butyl borate | — | 15.04 | 15.04 | — | 10.03 |
| Hexanol | 4.76 | — | — | — | — |
| Irgacur 819 | 0.25 | 0.25 | 0.25 | 0.25 | 0.25 |
| Reactive Blue RD 322 | 0.02 | 0.02 | 0.02 | 0.02 | 0.02 |
| Properties | | | | | |
| Modulus (g/mm2) | 81 (4) | 82 (4) | 90 (6) | 82 (5) | 106 (5) |
| Tensile Strength (g/mm2) | 90 (29) | 69 (15) | 63 (30) | 81 (20) | 71 (37) |
| % Elongation (%) | 180 (61) | 149 (34) | 105 (52) | 148 (25) | 99 (58) |
| Tear Strength (g/mm) | 5 (1) | 6 (0.4) | 4 (1) | 3 (1) | 4 (0.4) |
| Dk | 90.3 | 100.3 | 79.5 | 73.8 | 82.3 |
| Water Content (%) | 43.0 (0.2) | 45.8 (0.6) | 44.7 (0.2) | 43.2 (1.2) | 43.1 (0.1) |
| Contact Angle Adv. (lenses)** | — | — | — | — | — |
| Shore D Hardness (Buttons [Center/Outer]) | 68.0/66.8 | 68.8/74.4 | 77.0/81.4 | 67.8/73.2 | 72.8/77.2 |
| Lathing Ranking | — | — | 4 | 3 | 7 |

***Lathing Rankings: 1-7 1 = best

| Formulation | Ex. 14 | Ex. 15 | Ex. 16 | Ex. 17 | Ex. 18 |
|---|---|---|---|---|---|
| HEMA | 5.01 | 5.01 | 5.01 | 4.77 | 4.77 |
| DMA | 5.01 | 5.01 | 5.01 | 9.55 | 4.77 |
| NVP | 33.83 | 33.83 | 33.83 | 31.04 | 35.82 |
| M1-EDS6-TMS | 13.03 | 13.03 | 13.03 | 12.71 | 12.71 |
| TRIS | — | — | — | 35.05 | 35.05 |
| Ma2D37 | 8.02 | 8.02 | 8.03 | 6.88 | 6.88 |
| Sigma | 35.09 | 35.09 | 35.09 | — | — |
| CIX-4 | — | — | — | — | — |
| Monomer Mix (total) | 100 | 100 | 100 | 100 | 100 |
| Isopropyl borate | 15.04 | 20.05 | — | — | — |
| Tri-tert-butyl borate | — | — | 20.05 | — | — |
| Hexanol | — | — | — | 4.75 | 4.75 |
| Irgacur 819 | 0.25 | 0.25 | 0.25 | 0.25 | 0.25 |
| Reactive Blue RD 322 | 0.02 | 0.02 | 0.02 | 0.02 | 0.02 |
| Properties | | | | | |
| Modulus (g/mm2) | 94 (5) | 86 (5) | 98 (9) | 52 (3) | 76 (3) |
| Tensile Strength (g/mm2) | 85 (38) | 93 (12) | 89 (23) | 84 (10) | 92 (13) |
| % Elongation (%) | 143 (63) | 173 (19) | 146 (25) | 230 (25) | 195 (24) |
| Tear Strength (g/mm) | NA | NA | NA | 7 (0.4) | 5 (0.5) |
| Dk | 79 | 85.9 | 79 | 85.9 | 87.2 |

TABLE 4-continued

Diluent impact on dry lens Hardness

| | | | | | |
|---|---|---|---|---|---|
| Water Content (%) | 44.2 (0.2) | 45.0 (0.1) | 45.0 (0.1) | 36.2 (.02) | 46.7 (0.3) |
| Contact Angle Adv. lenses)** | | | | 91 (3.5) | 33 (0.3) |
| Shore D Hardness (Buttons [Center/Outer]) | — | — | — | — | — |
| Lathing Ranking | — | — | — | — | — |

***Lathing Rankings: 1-7 1 = best

TABLE 5

Lathing and Lens Studies. Diluent impact on dry lens Hardness

| Formulation | Ex. 19 | Ex. 20 | Ex. 21 | Ex. 22 | Ex. 23 | Ex. 24 |
|---|---|---|---|---|---|---|
| UV Blocker (Sigma-Aldrich) | — | — | — | — | — | — |
| HEMA | 4.77 | 4.77 | 4.77 | 4.77 | 4.60 | 4.60 |
| DMA | 9.54 | 9.54 | 4.77 | 4.77 | 9.19 | 9.19 |
| NVP | 32.22 | 32.22 | 36.99 | 36.99 | 34.69 | 34.69 |
| M1-EDS6-TMS | 12.41 | 12.41 | 12.41 | 12.41 | 11.96 | 11.96 |
| TRIS | 33.42 | — | 33.42 | — | — | — |
| Ma2D37 | 7.64 | 7.64 | 7.64 | 7.64 | 7.36 | 7.36 |
| Sigma | — | 33.42 | — | 33.42 | 32.20 | 32.20 |
| CIX-4 | — | — | — | — | — | — |
| Monomer Mix (total) | 100 | 100 | 100 | 100 | 100 | 100 |
| Isopropyl borate | — | — | — | — | — | 20 |
| Tri-tort-butyl borate | 15 | 15 | 15 | 15 | 20 | — |
| Hexanol | — | — | — | — | — | — |
| Irgacur 819 | 0.25 | 0.25 | 0.25 | 0.25 | 0.25 | 0.25 |
| Reactive Blue RD 322 | 0.02 | 0.02 | 0.02 | 0.02 | 0.02 | 0.02 |
| Properties | | | | | | |
| Modulus (g/mm2) | 47 (3) | — | 71 (5) | — | 39 (3) | 48 (3) |
| Tensile Strength (g/mm2) | 87 (21) | — | 64 (26) | — | 39 (34) | 29 (40) |
| % Elongation (%) | 236 (45) | — | 134 (62) | — | 83 (72) | 63 (82) |
| Tear Strength (g/mm) | 5 (1) | — | 5 (0.3) | — | 2 (0.2) | 2 (0.6) |
| Dk | 86.2 | 74.2 | 93.1 | 83.4 | 68.1 | 70.9 |
| Water Content (%) | 48.8 (0.4) | — | 47.3 (0.1) | — | 51.1 (0.2) | 51.2 (0.5) |
| Contact Angle Adv. (lenses)** | 59 (14.4) | 112 (1.4) | 34 (1.2) | 62 (6.0) | — | — |
| Shore D Hardness (Buttons [Center/Outer]) | — | — | — | — | — | — |

Lathing Ranking 1 = Best

| Formulation | Ex. 25 | Ex. 26 | Ex. 27 | Ex. 28 | Ex. 29 |
|---|---|---|---|---|---|
| UV Blocker (Sigma-Aldrich) | 0 | — | — | 0.72 | 0.72 |
| HEMA | 4.59 | — | — | 5.07 | 5.07 |
| DMA | 4.59 | 6.00 | 6.00 | 5.07 | 5.07 |
| NVP | 34.62 | 43.70 | 43.70 | 32.42 | 32.42 |
| M1-EDS6-TMS | 11.93 | — | — | 13.17 | 13.17 |
| TRIS | — | 41 | — | — | — |
| Ma2D37 | 7.35 | 9.00 | 9.00 | 8.11 | 8.11 |
| Sigma | 36.93 | — | 41.00 | 35.46 | 35.46 |
| CIX-4 | 0 | 0.3 | 0.3 | — | — |
| Monomer Mix (total) | 100 | 100 | 100 | 100 | 100 |
| Isopropyl borate | 20 | 20 | 20.00 | — | 11.00 |
| Tri-tort-butyl borate | — | — | — | 11.00 | — |
| Hexanol | — | — | — | — | — |
| Irgacur 819 | 0.25 | 0.4 | 0.4 | 0.50 | 0.50 |
| Reactive Blue RD 322 | 0.02 | 0.02 | 0.02 | 0.02 | 0.02 |
| Properties | | | | | |
| Modulus (g/mm2) | 83 (3) | 129 (3) | 81 (8) | — | — |
| Tensile Strength | 63 (37) | 122 (12) | 39 (15) | — | — |
| % Elongation (%) | 108 (65) | 195 (18) | 78 (36) | — | — |
| Tear Strength (g/mm) | 4 (0.3) | 7 (0.1) | 4 (0.4) | — | — |
| Dk | 74.4 | 74.7 (1.2) | 66.0 (0.8) | — | — |
| Water Content (%) | 44.2 (0.6) | 50.9 (0.4) | 52.8 (0.2) | — | — |

TABLE 5-continued

| Lathing and Lens Studies. Diluent impact on dry lens Hardness | | | | | |
|---|---|---|---|---|---|
| Contact Angle Adv. (lenses )** | — | — | — | — | — |
| Shore D Hardness (Buttons [Center/Outer]) | — | — | — | — | — |
| Lathing Ranking 1 = Best | | 1 | 2 | 6 | 5 |

LATHING EVALUATIONS OF EXAMPLES 11-13 AND 26-29

Lathing evaluation of the lenses obtained in Examples 16-18 and 26-29 are given below. A comparison was made to the lens of Example 2 [Ranking based on machining properties].

EXAMPLE 11

Comments: Very soft lot. Good optical quality but images were very dull. [Ranking 4 of 7]

EXAMPLE 12

Comments: Base curve lathing looked good, extremely light center spot and good surface texture. There were no visible swirls within the material. This lot was the 3rd best of the group for machining. This lot machined about the same as example 2 [Ranking 3 of 7].

EXAMPLE 13

Comments: Very soft lot. No optical image, [Ranking 7 of 7].

EXAMPLE 26

Comments: Base curve lathing looked excellent, light center soft spot and excellent surface texture. No visible swirls within the material. Best lot of the group for the following attributes; dry lens distortion, lathing cut quality and dry optical quality. Lathing far exceeds the lens of Example 2. This lot cuts more like a rigid gas permeable material, [Ranking 1 of 7].

EXAMPLE 27

Comments: Very good surface texture. No visible swirls within the material (slightly opaque/cloudy in appearance) second best lot of the group for machining. Machining on this lot was better than Example 2, [Ranking 2 of 7] Note: extracted and hydrated lens deem to be acceptable.

EXAMPLE 28

Comments: Very soft lot of material. Crisp optics but very dull images [Ranking 6 of 7]

EXAMPLE 29

Comments: Machining was scored slightly lower than material of example 2. No visible swirls within the material. [Ranking 5 of 7]

EXAMPLES 30 AND 31 AND COMPARATIVE EXAMPLE 3-8

Comparison of a boric acid ester of a polyhydric alcohol versus a boric acid ester of a monohydric alcohol.

The boric acid ester of a polyhydric alcohol was prepared according to the following preparation disclosed in U.S. Pat. No. 4,889,664:

The boric acid and alcohol were charged to a 2-liter 1-neck round bottom flask rotating evaporator pre-set to 90° C. A mild vacuum (100 mmHg) was applied until all components went into solution and then the vacuum was set to 10 mm Hg. The reaction was allowed to proceed for 3 hrs at 90° C. under 10 mm Hg. The open neck was stoppered with a rubber septum for 3 days prior to use.

Monomer Mixes

The components and amounts used for Examples 30 and 31 and Comparative Examples 3-8 are set forth below in Table 6. All of the components were mixed under dry air conditions in a glove box. The monomer mixtures of Comparative Examples 3-8 containing a boric acid ester of a polyhydric alcohol were two-phase mixtures, thereby rendering them unsuitable for making a contact lens.

TABLE 6

| | Diluent Compatibility Study | | | | | | | |
|---|---|---|---|---|---|---|---|---|
| | Composition (wt %) | | | | | | | |
| Component | Ex. 30 | Comp Ex. 3 | Comp Ex. 4 | Comp Ex. 5 | Ex. 31 | Comp Ex. 6 | Comp Ex. 7 | Comp Ex. 8 |
| TRIS | 41 | 41 | 41 | 41 | 36.7 | 36.7 | 36.7 | 36.7 |
| Ma2D37 | 9 | 9 | 9 | 9 | 7.4 | 7.4 | 7.4 | 7.4 |
| NVP | 43.7 | 43.7 | 43.7 | 43.7 | 32.5 | 32.5 | 32.5 | 32.5 |
| CIX-4 | 0.3 | 0.3 | 0.3 | 0.3 | — | — | — | — |
| DMA | 6 | 6 | 6 | 6 | 5 | 5 | 5 | 5 |
| M1-EDS-6 | — | — | — | — | 13.4 | 13.4 | 13.4 | 13.4 |
| HEMA | — | — | — | — | 5 | 5 | 5 | 5 |
| Monomer mix (total) | 100 | 100 | 100 | 100 | 100 | 100 | 100 | 100 |
| Triisopropyl Borate | 11 | — | — | — | 11 | — | — | — |
| Glycerol Borate | — | 11 | — | — | — | 11 | — | — |

TABLE 6-continued

Diluent Compatibility Study

| Component | Composition (wt %) | | | | | | | |
|---|---|---|---|---|---|---|---|---|
| | Ex. 30 | Comp Ex. 3 | Comp Ex. 4 | Comp Ex. 5 | Ex. 31 | Comp Ex. 6 | Comp Ex. 7 | Comp Ex. 8 |
| Diethylene glycol Borate | — | — | 11 | — | — | — | 11 | — |
| 1,4-Butanediol Borate- | — | — | — | 11 | — | — | — | 11 |
| Irgacure 819 | 0.4 | 0.4 | 0.4 | 0.4 | 0.4 | 0.4 | 0.4 | 0.4 |
| Reactive Blue Tint | 0.02 | 0.02 | 0.02 | 0.02 | 0.02 | 0.02 | 0.02 | 0.02 |
| Mix Appearance | Clear | Two phases | Two phases | Two phases | Clear | Two phases | Two phases | Two phases |

EXAMPLES 32-36 AND COMPARATIVE EXAMPLES 9-13

The following procedures illustrate a process for casting of a contact lens. Silicone hydrogel lenses made of the formulation of the examples in Table 7 below were cast molded from polypropylene molds. Under an inert nitrogen atmosphere, 43 to 45 μl of the formulation was injected onto a clean polypropylene concave mold half and covered with the complementary polypropylene convex mold half. The mold halves were compressed using a top plate and then the top plate was removed and the mixture was cured for about 25 minutes in the presence of visible light (2.115 mW/cm² as measured by an International Light Technologies Radiometer photometer model # ILT 1400-A). Cast molded lenses were cured by irradiating from the top.

Silicone hydrogel lenses made of the formulation of the examples in Table 8 below ere also cast molded from polypropylene molds. Under an inert nitrogen atmosphere, 43 to 45 μl of the formulation was injected onto a clean polypropylene concave mold half and covered with the complementary polypropylene convex mold half. The mold halves were compressed using a top plate and then the top plate was removed and the mixture was cured for about 25 minutes in the presence of visible light (9.70 mW/cm² as measured by an International Light Technologies Radiometer photometer model # ILT 1400-A). Cast molded lenses were cured by irradiating from the top.

After the monomer mixes were cured, the top mold half was removed and the lenses were released as described below and extracted using 100% isopropanol at 60° C. for 1 hour, then one 1 hour change of 50%:50% isopropanol:DI water at room temperature, followed by one 1 hour change of 100% borate buffered solution.

TABLE 7

| Formulation data and Properties | | | | | | |
|---|---|---|---|---|---|---|
| Formulation (wt. %) | Comp. Ex. 9 | Ex. 32 | Comp. Ex. 10 | Ex. 33 | Comp. Ex. 11 | Ex. 34 |
| TRIS | 41 | 41 | 41 | 41 | 41 | 41 |
| Ma2D37 | 9 | 9 | 9 | 9 | 9 | 9 |
| M1-EDS-6 | — | — | — | — | — | — |
| NVP | 43.7 | 43.7 | 43.7 | 43.7 | 43.7 | 43.7 |
| CIX4 | 0.3 | 0.3 | 0.3 | 0.3 | 0.3 | 0.3 |
| DMA | 6 | 6 | 6 | 6 | 6 | 6 |
| HEMA | — | — | — | — | — | — |
| Monomer Mix Total | 100 | 100 | 100 | 100 | 100 | 100 |
| t-amyl alcohol | 20 | — | — | — | — | — |
| tri-tert-pentyl borate | — | 20 | — | — | — | — |
| 3-methyl-3-pentanol | — | — | 20 | — | — | — |
| tri (3-methyl-3-pentyl) borate | — | — | — | 20 | — | — |
| 3,7-dimethyl-3-octanol | — | — | — | — | 20 | — |
| tri (3,7-dimethyl-3-octyl) borate | — | — | — | — | — | 20 |
| Irgacure 819 | 0.4 | 0.4 | 0.4 | 0.4 | 0.4 | 0.4 |
| Tint | 0.02 | 0.02 | 0.02 | 0.02 | 0.02 | 0.02 |
| Properties | | | | | | |
| Modulus (g/mm2) | 115 (9) | 102 (7) | 111 (6) | 98 (9) | 124 (2) | 95 (7) |
| Tensile Strength (g/mm2) | 78 (28) | 121 (15) | 111 (27) | 109 (33) | 98 (44) | 110 (46) |
| % Elongation (%) | 107 (41) | 190 (19) | 171 (33) | 177 (31) | 134 (61) | 178 (65) |
| Tear Strength (g/mm) | 6 (1) | 5 (0.5) | 6 (0.4) | 5 (2) | 6 (1) | 6 (1) |
| Water Content (%) | 51.5 (0.1) | 51.6 (0.2) | 52.5 (0.5) | 52.1 (0.3) | 50.6 (0.1) | 51.7 (0.5) |
| Contact Angle Adv. | 34 (0.2) | 36 (0.6) | 35 (0.8) | 35 (0.3) | 35 (0.3) | 36 (2.7) |

TABLE 8

| Formulation data and Properties | | | | |
|---|---|---|---|---|
| | Comp. Ex. 12 | Ex. 35 | Comp. Ex. 13 | Ex. 36 |
| Formulation (wt. %) | | | | |
| TRIS | 36.71 | 36.71 | 36.71 | 36.71 |
| Ma2D37 | 7.44 | 7.44 | 7.44 | 7.44 |
| M1-EDS-6 | 13.36 | 13.36 | 13.36 | 13.36 |
| NVP | 32.5 | 32.5 | 32.5 | 32.5 |
| CIX4 | — | — | — | — |
| DMA | 5 | 5 | 5 | 5 |
| HEMA | 5 | 5 | 5 | 5 |
| Monomer Mix Total | 100 | 100 | 100 | 100 |
| 3-methyl-3-pentanol | 7.5 | — | — | — |
| tri (3-methyl-3-pentyl) borate | — | 7.5 | — | — |
| 3,7-dimethyl-3-octanol | — | — | 7.5 | — |
| tri (3,7-dimethyl-3-octyl) borate | — | — | — | 7.5 |
| Irgacure 819 | 0.5 | 0.5 | 0.5 | 0.5 |
| Tint | 0.02 | 0.02 | 0.02 | 0.02 |
| Properties | | | | |
| Modulus (g/mm2) | 81 (5) | 69 (3) | 69 (5) | 55 (4) |
| Tensile Strength (g/mm2) | 82 (25) | 70 (19) | 73 (14) | 52 (12) |
| % Elongation (%) | 234 (69) | 164 (42) | 178 (36) | 164 (32) |
| Tear Strength (g/mm) | 14 (2) | 6 (1) | 6 (1) | 5 (1) |
| Water Content (%) | 26.2 (0.4) | 44.7 (0.2) | 44 (0.2) | 44.3 (0.3) |
| Contact Angle Adv. | 79 (2.2) | 41 (3.5) | 46 (1.3) | 71 (3.6) |

Dry Release Evaluation—after curing of the lens in the mold assembly:

1. The base curve part of the mold (concave portion) is first removed (i.e. "decapping") and the assembly with the cured lens still in the front half of the mold was allowed to sit for 2-3 minutes at ambient condition.

2. The lenses were then removed mechanically from the molds using tweezers, taking precaution not to tear them.

If mechanical removal did not work, the mold half containing the lens was mechanically deformed to forcibly release the article.

The following observations for the release of the lenses formed in Comparative Examples 9-13 and Examples 32-36 are as follows:

COMPARATIVE EXAMPLE 9

(t-amyl alcohol)—Wet released, could not be dry released.

COMPARATIVE EXAMPLE 10

(3-methyl-3-pentanol)—Wet released, could not be dry released.

COMPARATIVE EXAMPLE 11

(3,7-dimethyl-3-octanol)—Dry released with difficulty, hard to remove mechanically. Some tearing.

COMPARATIVE EXAMPLE 12

(3-methyl-3-pentanol)—Wet released. Very tacky lenses, would not dry release.

COMPARATIVE EXAMPLE 13

(3,7-dimethyl-3-octanol)—Wet released. Very tacky lenses, would not dry release.

EXAMPLE 32

(t-amylborate)—Dry released easily on its own. No need to deform the mold assembly.

EXAMPLE 33

(3-methyl-3-pentyl borate)—Dry released by deforming the mold half.

EXAMPLE 34

(3,7-dimethyl-3-octylborate)—Dry released by mechanically removing from the mold half. No need to deform the mold half.

EXAMPLE 35

(3-methyl-3-pentylborate)—Dry released by mechanically removing from the mold half. No need to deform the mold half.

EXAMPLE 36

(3,7-dimethyl-3-octylborate)—Dry released by mechanically removing from the mold half. No need to deform the mold half.

Accordingly, as can be seen, the lenses of Comparative Examples 9-13 prepared using a monohydric alcohol could not be dry released at all or resulted in a tearing of lens making it unsuitable for use. On the other hand, the lenses of Examples 32-36 prepared from the corresponding boric acid ester were easily dry released from the mold assembly.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A method of preparing a water extractable silicon-containing biomedical device comprising; curing a monomer mixture in a mold, the monomer mixture comprising one or more silicon-containing biomedical device-forming monomers in the presence of a diluent to produce a silicon-containing biomedical device; wherein the diluent comprises a boric acid ester of a $C_1$ to $C_8$ monohydric alcohol; and dry releasing the silicon-containing biomedical device from the mold.

2. The method of claim 1, wherein the silicon-containing biomedical device-forming monomer is a silicon-containing monomer containing one or more Si—O units.

3. The method of claim 1, wherein the monomer mixture further comprises a hydrophilic monomer, hydrophobic monomer or both.

4. The method of claim 3, wherein the hydrophilic monomer is selected from the group consisting of an unsaturated carboxylic acid, vinyl lactam, acrylamide, polymerizable amine, vinyl carbonate, vinyl carbamate, oxazolone monomer and mixtures thereof.

5. The method of claim 3, wherein the hydrophilic monomer is selected from the group consisting of methacrylic and acrylic acids, 2-hydroxyethylmethacrylate, N-vinylpyrrolidone, methacrylamide, N,N-dimethylacrylamide and mixtures thereof.

6. The method of claim 3, wherein the hydrophobic monomer is selected from the groups consisting of an ethylenically unsaturated polymerizable fluorine-containing monomer, ethylenically unsaturated polymerizable fatty acid ester-containing monomer, ethylenically unsaturated polymerizable polysiloxanylalkyl-containing monomer, ethylenically unsaturated polymerizable monomer having ring-opening reactive functionalities, and mixtures thereof.

7. The method of claim 3, wherein the hydrophobic monomer is selected from the groups consisting of an ethylenically unsaturated polymerizable fluorine-containing monomer, ethylenically unsaturated polymerizable fatty acid ester-containing monomer, ethylenically unsaturated polymerizable ethylenically unsaturated polymerizable monomer having ring-opening reactive functionalities, and mixtures thereof.

8. The method of claim 1, wherein the monomeric mixture comprises two or more silicon-containing biomedical device-forming monomer which are silicon-containing monomer containing one or more Si—O units, and one or more hydrophilic units.

9. The method of claim 1, wherein the $C_1$ to $C_8$ monohydric alcohol of the boric acid ester is selected from the group consisting of $C_1$ to $C_8$ straight or branched chain monohydric alcohols, $C_5$ to $C_8$ cycloalkyl monohydric alcohols, $C_5$ to $C_8$ aromatic monohydric alcohols and mixtures thereof.

10. The method of claim 9, wherein the $C_1$ to $C_8$ monohydric alcohol of the boric acid ester is selected from the group consisting of methanol, ethanol, propanol, n-propanol, isopropanol, n-butanol, t-butanol, isobutanol, 2-ethylhexanol, 2-methylcyclohexanol, 2- methyl-1-propanol, n-pentanol, 2-pentanol, 3-pentanol, 2-methyl-1-butanol, 3-methyl-1-butanol, 2-methyl-2-butanol, 3-methyl-2-butanol, 3,7-dimethyl-3-octanol, 2,2-dimethyl-1-propanol, 1-hexanol, 1-octanol, 2-octanol, cyclohexanol, cyclopentanol, benzyl alcohol, and mixtures thereof.

11. The method of claim 1, wherein the boric acid ester of a $C_1$ to $C_8$ monohydric alcohol is trimethyl borate, triethyl borate, tri-n-propyl borate, triisopropyl borate, tri-n-butyl borate, or tri-tert-butyl borate.

12. The method of claim 1, wherein the monomer mixture comprises about 5 to about 50 percent by weight of the boric acid ester of a $C_1$ to $C_8$ monohydric alcohol, based on the total weight of the monomer mixture.

13. The method of claim 1, wherein the monomer mixture comprises about 15 to about 30 percent by weight of the boric acid ester of a $C_1$ to $C_8$ monohydric alcohol, based on the total weight of the monomer mixture.

14. The method of claim 1, further comprising the step of replacing the diluent with water.

15. The method of claim 14, wherein the silicon-containing biomedical device is a silicon hydrogel.

16. The method of claim 1, further comprising lathing the silicon-containing biomedical device.

17. The method of claim 1, wherein the mold is a one-piece mold having a concave bottom surface.

18. The method of claim 1, wherein the mold comprises a first mold section having a molding surface shaped to provide a posterior biomedical device surface and a second mold section having a molding surface shaped to provide an anterior biomedical device surface.

19. The method of claim 18, further comprising de-capping the first mold section from the second mold section and dry releasing the silicon-containing biomedical device from either the first mold section or the second mold section.

20. The method of claim 1, further comprising contacting the silicon-containing biomedical device with a solvent.

21. The method of claim 20, wherein the solvent is a polar solvent.

22. The method of claim 21, wherein the polar solvent is water.

23. The method of claim 21, wherein the polar solvent is an alcohol.

24. The method of claim 1, wherein the silicon-containing biomedical device is an ophthalmic lens.

25. The method of claim 24, wherein the ophthalmic lens is a contact lens.

26. A method for dry releasing a silicon-containing biomedical device from a mold, the method comprising the steps of:
  (a) curing a monomer mixture in a mold under conditions sufficient to polymerize the monomer mixture to produce a water extractable silicon-containing biomedical device, wherein the monomer mixture comprises one or more silicon-containing biomedical device-forming monomers and a diluent; wherein the diluent comprises a boric acid ester of a $C_1$ to $C_8$ monohydric alcohol; and
  (b) dry releasing the silicon-containing biomedical device from the mold.

\* \* \* \* \*